(12) United States Patent
Hoffman et al.

(10) Patent No.: US 11,390,445 B1
(45) Date of Patent: Jul. 19, 2022

(54) PACKAGING PRODUCTS AND ASSOCIATED MATERIAL

(71) Applicant: Amazon Technologies, Inc., Seattle, WA (US)

(72) Inventors: Brian Hoffman, Seattle, WA (US); Michael Ralph, Ann Arbor, MI (US); Timothy Alan Talda, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/917,652

(22) Filed: Jun. 30, 2020

Related U.S. Application Data

(62) Division of application No. 15/720,538, filed on Sep. 29, 2017, now Pat. No. 10,717,583.

(51) Int. Cl.
*B65D 81/03* (2006.01)
*B65D 65/40* (2006.01)
(Continued)

(52) U.S. Cl.
CPC .......... *B65D 81/03* (2013.01); *B65D 65/406* (2013.01); *B32B 27/06* (2013.01); *B32B 29/002* (2013.01);
(Continued)

(58) Field of Classification Search
CPC .... B65D 81/03; B65D 85/345; B65D 81/025; B65D 81/02; B65D 81/022; B65D 65/406;
(Continued)

(56) References Cited

U.S. PATENT DOCUMENTS 2,962,158 A 11/1960 Struthers
3,303,629 A 2/1967 Tobin
(Continued)

FOREIGN PATENT DOCUMENTS

JP 01-294465 A 11/1989
WO WO 1997/003816 A1 2/1997
WO WO 2000/005149 A2 2/2000

OTHER PUBLICATIONS

U.S. Appl. No. 15/655,318, filed Jul. 20, 2017, Hoffman et al.
(Continued)

*Primary Examiner* — Rafael A Ortiz
(74) *Attorney, Agent, or Firm* — BakerHostetler

(57) ABSTRACT

A packaging cushion includes a first liner and a second liner opposite one another and each defining an inner surface. A transverse liner axis extends normal to the inner surfaces. The packaging cushion includes a mesh bonded to and disposed between the first and second liners. The mesh has a top mesh surface and an opposed bottom mesh surface. The mesh defines a plurality of nodes and a plurality of legs interconnecting the plurality of nodes. Each of the plurality of nodes defines 1) a top node surface defined by the top mesh surface, 2) a bottom node surface defined by the bottom mesh surface, and 3) a transverse node axis extending substantially normal to the top and bottom node surfaces. The transverse node axes of at least some of the plurality of nodes are each oriented at an oblique angle relative to the transverse liner axis.

20 Claims, 9 Drawing Sheets

(51) Int. Cl.
  *B32B 27/06* (2006.01)
  *B32B 37/12* (2006.01)
  *B32B 29/00* (2006.01)
  *B32B 37/14* (2006.01)

(52) U.S. Cl.
  CPC ......... *B32B 37/12* (2013.01); *B32B 2037/148* (2013.01); *B32B 2307/56* (2013.01)

(58) Field of Classification Search
  CPC ...... B65D 65/44; B65D 65/403; B32B 27/06; B32B 37/12; B32B 2037/148
  USPC .......................................... 206/521; 229/68.1
  See application file for complete search history.

(56) References Cited

U.S. PATENT DOCUMENTS

| | | | |
|---|---|---|---|
| 3,762,629 A | 10/1973 | Bruno | |
| 3,867,874 A | 2/1975 | O'Neil | |
| 3,906,128 A | 9/1975 | Burling et al. | |
| 4,011,798 A | 3/1977 | Bambara et al. | |
| 4,087,002 A | 5/1978 | Bambara et al. | |
| 4,105,724 A | 8/1978 | Talbot | |
| 4,253,892 A | 3/1981 | D'Angelo et al. | |
| 4,265,956 A | 5/1981 | Colijn | |
| 4,297,154 A | 10/1981 | Keller | |
| 4,832,228 A | 5/1989 | Hickey | |
| 4,921,118 A | 5/1990 | Gass | |
| 5,030,501 A | 7/1991 | Colvin et al. | |
| 5,207,020 A | 5/1993 | Aslam et al. | |
| 5,503,328 A | 4/1996 | Roccaforte et al. | |
| 5,651,402 A | 7/1997 | McCaul | |
| 5,667,871 A | 9/1997 | Goodrich et al. | |
| 6,089,325 A | 7/2000 | Yassin Alhamad | |
| 6,800,162 B2 | 10/2004 | Kannankeril et al. | |
| 6,898,922 B2 | 5/2005 | Reist | |
| 7,128,211 B2 | 10/2006 | Nishi et al. | |
| 7,200,974 B2 | 4/2007 | Higer et al. | |
| 7,220,476 B2 | 5/2007 | Sperry et al. | |
| 7,223,461 B2 | 5/2007 | Kannankeril et al. | |
| 7,240,468 B2 | 7/2007 | Tanaka et al. | |
| 7,658,543 B2 | 2/2010 | Shiokawa et al. | |
| 8,919,689 B2 | 12/2014 | Kuchar et al. | |
| 9,266,300 B2 | 2/2016 | Chuba et al. | |
| 9,315,319 B2 | 4/2016 | Maxwell et al. | |
| 9,586,747 B2 | 3/2017 | Zhang | |
| 9,649,823 B2 | 5/2017 | Prud'homme et al. | |
| 9,827,711 B2 | 11/2017 | Wetsch et al. | |
| 9,969,136 B2 | 5/2018 | Lepine et al. | |
| 10,002,692 B2 | 6/2018 | Czyzewski et al. | |
| 10,301,121 B1 | 5/2019 | Hoffman et al. | |
| 10,647,460 B2 | 5/2020 | Wehrmann | |
| 2004/0000581 A1 | 1/2004 | Brandolini et al. | |
| 2008/0020188 A1 | 1/2008 | Gale | |
| 2014/0130461 A1 | 5/2014 | Johan | |
| 2015/0314936 A1 | 11/2015 | Stack, Jr. | |
| 2016/0067938 A1 | 3/2016 | Goodrich | |
| 2017/0107017 A1* | 4/2017 | Kuchar | B65D 65/38 |
| 2017/0203866 A1 | 7/2017 | Goodrich | |
| 2018/0370702 A1 | 12/2018 | Goodrich | |
| 2019/0100369 A1 | 4/2019 | Hoffman et al. | |

OTHER PUBLICATIONS

U.S. Appl. No. 15/891,600, filed Feb. 8, 2018, Talda et al.
U.S. Appl. No. 16/147,073, filed Sep. 28, 2018, Hoffman.
U.S. Appl. No. 16/147,160, filed Sep. 28, 2018, Hoffman.
International Patent Application No. PCT/US2018/053372; Int'l Search Report and the Written Opinion; dated Nov. 30, 2018; 13 pages.

* cited by examiner

PACKAGING PRODUCTS AND ASSOCIATED MATERIAL

CROSS REFERENCE TO RELATED APPLICATION

This application is a divisional of U.S. patent application Ser. No. 15/720,538 filed on Sep. 29, 2017, the disclosure of which is hereby incorporated by reference in its entirety.

BACKGROUND

The present invention relates to packaging, and more particularly to structure and function of packaging structures for shipping products.

Many common packaging products, such as, for example, padded envelopes (e.g., "jiffy mailers" or "bubble mailers"), are made from a combination of paper-based materials and plastic-based materials bonded together. While the paper-based materials of the packaging product may be recyclable in a paper-based recycling facility and the plastic-based materials may be recyclable in a plastic-based recycling facility, such products need to be separated into their paper-based and plastic-based materials prior to depositing them into a recycling bin, at least in most areas or municipalities. Thus, such products, as received by a consumer or other recipient, are not considered "curbside recyclable." Unfortunately, such packaging products often find their way into landfills or other garbage disposal sites.

The inventors of the present disclosure have identified that imparting deformations in prior art paper-based packaging products, such as rigid corrugated paperboard (also referred to as "cardboard" or "corrugate"), results in impairment of performance of such products because rigidity becomes compromised. After rigid corrugated paperboard is folded, creased, and/or bent, portions thereof have localized weaknesses that can impair its protective functionality which relies substantially on rigidity. For example, certain types of corrugate possess a high compressive strength yet, should a crease be formed therein, the corrugate no longer exhibits protective functionality because its strength is compromised. Moreover, while certain features can be incorporated into paper-based packaging products to enhance strength, such features add complexity, and thus cost, to such packaging products.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

The embodiments of the present disclosure pertain to packaging products and material used to form the padded mailer that includes a mesh cushion layer that provides multi-directional flexibility and may also be curbside-recyclable at least with only trivial preparation. The embodiments of the present disclosure include padded envelopes, for example, that employ such cushion layers and are optionally curbside-recyclable. As used herein with respect to packaging products or portions thereof (such as a cushion or a cushioning layer, for example), the terms "resilient", "resilience", "resiliency", and derivatives thereof refer to an ability to at least partially recover one's size and shape after deformation, particularly (though not exclusively) deformation responsive to compressive stress.

Figure 1:
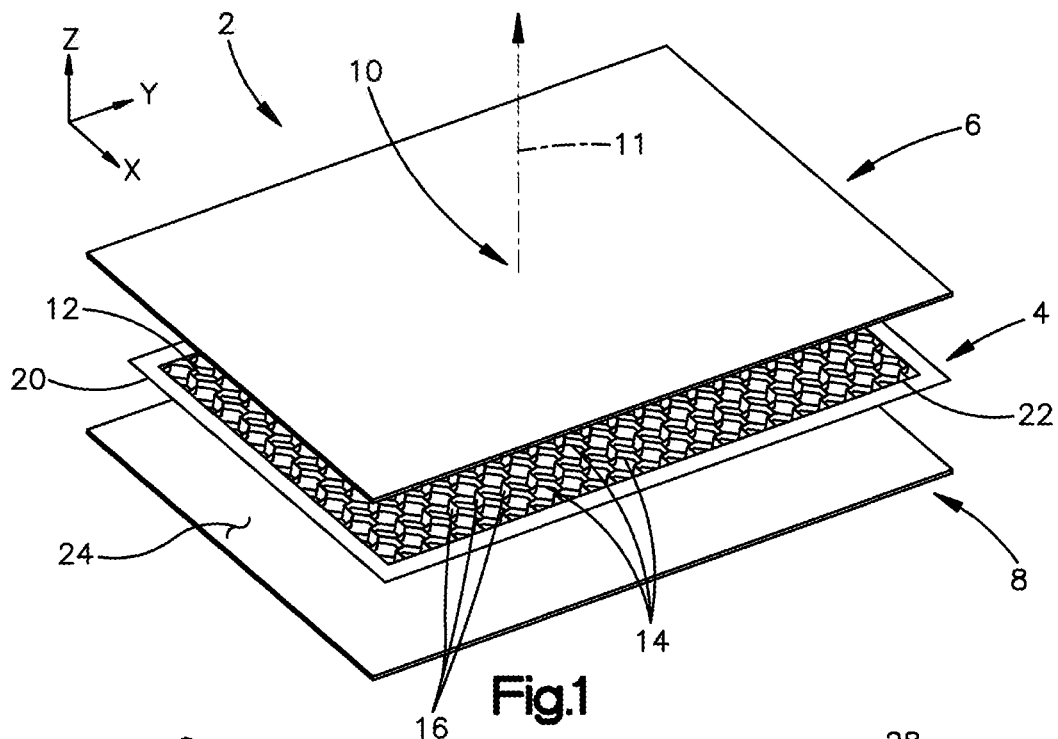
FIG. 1 shows an exploded perspective view of constituent layers of a packaging cushion, including a cushion layer having a mesh, such as a paper-based mesh, according to an embodiment of the present disclosure.

Referring to FIG. 1, a packaging cushion 2 includes a cushion layer 4 disposed between a first outer layer of material 6 and a second outer layer of material 8 such that the layers 4, 6, 8 define a laminar or "sandwich" structure. The outer layers 6, 8 can be referred to as an "outer liner" and an "inner liner", or vice versa. FIG. 1 depicts the packaging cushion 2 in an initial, substantially flat configuration, in which the outer layers 6, 8 and the cushion layer 4 are each elongated in substantially planar manner along a longitudinal direction X and a lateral direction Y that are substantially perpendicular to each other. The layers 4, 6, 8 also each have a thickness in a transverse direction Z that is substantially perpendicular to the longitudinal and lateral directions X, Y. The transverse direction Z is denoted as the "Z" direction because it extends across the sandwich structure of the layers 4, 6, 8. It is to be appreciated that the packaging cushion 2 can be flexible; thus, with respect to any location 10 on the packaging cushion 2, the packaging cushion 2 defines a transverse axis 11 oriented along the transverse direction Z at the location 10, such that the transverse direction Z is substantially orthogonal to the outer layers 6, 8 at the location 10. When the packing cushion 2 is in the initial configuration, the transverse direction Z is substantially perpendicular to the longitudinal and lateral directions X, Y.

Figure 2:
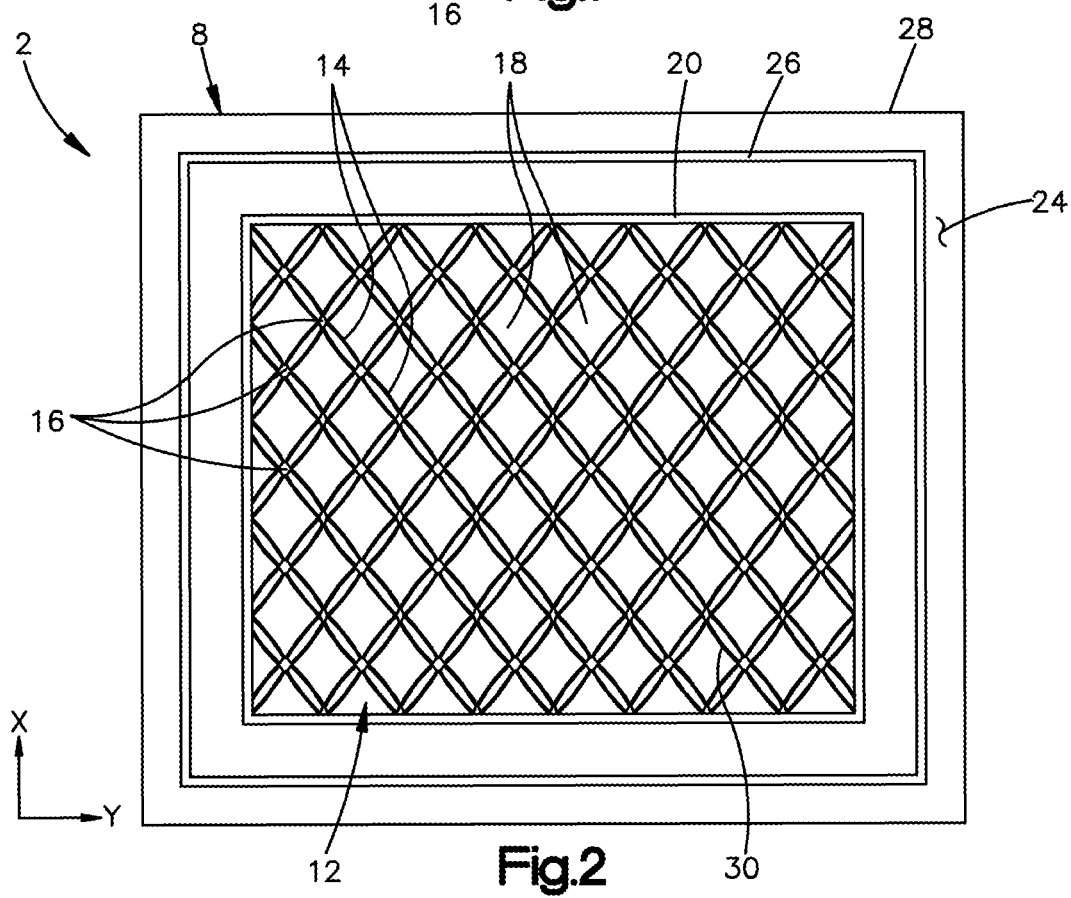
FIG. 2 shows a top plan view of a packaging cushion including a mesh, with an outer layer of material omitted for visualization purposes, wherein the packaging cushion is similar to that shown in FIG. 1, and the mesh is formed in a single piece of corrugate, according to an embodiment of the present disclosure.

The cushion layer 4 includes a flexible mesh 12 (also referred to herein as a "mesh"), which includes a plurality of legs 14 extending between a plurality of nodes 16, as also shown in FIG. 2. Flexible mesh 12 may be made of paper, metal, plastic, and/or other materials. The plurality of legs 14 can interconnect the plurality of nodes 16. The legs 14 and nodes 16 can define a plurality of voids or "cells" 18 in the mesh 12 extending between adjacent legs 14 and nodes 16 along the longitudinal and lateral directions X, Y. The legs 14 and nodes 16 can be arranged into patterns in a manner such that the cells 18 are also arranged into patterns, as set forth in more detail below. It is to be appreciated that the packaging cushion 2 can itself be characterized as a piece of corrugate, with the outer layers 6, 8 fulfilling the role of the outer and inner liners and the mesh 12 fulfilling the role of the fluting.

In some embodiments, such as the present embodiment, the layers 4, 6, 8 of the packaging cushion 2 can each be formed of one or more paper-based materials that are curbside recyclable. As used herein, the term "curbside recyclable" means capable of being recycled in a recycling facility and/or in a recycling process available to the public through most municipal recycling programs. In some such embodiments, each of the outer layers 6, 8 can be formed substantially entirely of a packaging paper, such as kraft paper or paperboard, by way of non-limiting examples. Additionally, the mesh 12 can be formed substantially entirely of kraft paper, paperboard, or corrugated paperboard (i.e., "cardboard" or "corrugate"). Thus, the packaging cushion 2 can be paper-recyclable.

A binder 20 can, for example, be disposed around a periphery 22 of the mesh 12 in a manner attaching the mesh 12 to one or both of the outer layers 6, 8. The binder 20 can be applied so as to contact the mesh 12 primarily at peripheral nodes 16, as shown. However, in other embodiments, the binder 20 can be applied so as to contact peripheral legs 14, or both peripheral legs 14 and peripheral nodes 16. In further embodiments, the binder 20 can be applied so as to contact non-peripheral legs 14 and/or non-peripheral nodes 16. It is to be appreciated that the binder 20 can be applied so as to contact any combination of legs 14 and/or nodes 16. The binder 20 can be an adhesive, such an adhesive strip (or strips), and/or a liquid-based adhesive, such as an epoxy or glue, by way of non-limiting examples. Adhesive may alternatively or additionally be applied via aerosol dispersed throughout at least a portion of the space between the mesh 12 and the adjacent outer layers 6, 8. In further embodiments, adhesive can be applied to one or both of the inner surfaces 24 of the outer layers 6, 8 in an evenly and/or unevenly distributed manner. For example, an even coating of adhesive can be applied to one or both of the inner surfaces 24 of the outer layers 6, 8, which coating can adhere to the opposite side of the mesh 12. In yet other embodiments, adhesive can be applied to one or both of the inner surfaces 24 of the outer layers 6, 8 in a pattern, such as a zig-zag pattern, for example. Such a zig-zag pattern can optionally correspond to a pattern defined by the mesh 12.

The binder 20 may include recyclable and/or non-recyclable components. Many municipalities provide residential curbside recyclability for packaging that includes small amounts of non-recyclable materials. For this reason, binder 20 may include conventional adhesives, such as those used in prior art corrugate boxes. Alternatively, or additionally, binder 20 may be a PLA-capable adhesive. In other embodiments, the binder 20 can include an adhesive cord or string, such as a cotton and/or hemp-based adhesive string, for example. The binder 20 can consist of one or more materials that are recyclable, such as Recycling Compatible Adhesives ("RCAs"), such as Corvinax (e.g., Corvinax 324-39, Corvinax 379-05, Corvinax 418-01), for example.

Referring now to FIG. 2, a cushion layer 4 is shown with the first outer layer 6 removed. The mesh 12 is shown attached to a support surface 24 of the second outer layer 8 by the binder 20 extending around the periphery 22 of the mesh 12. A second binder 26 can be disposed adjacent a periphery 28 of the second outer layer 8 and can be configured to bind the second outer layer 8 to the first outer layer 6. As with the first binder 20, the second binder 26 can optionally be substantially 100 percent paper-recyclable.

With reference to FIGS. 3 through 11, the mesh 12 can have multi-directional flexibility, as well as improved resiliency relative to prior art corrugate, in at least one of the longitudinal, lateral, and transverse directions X, Y, Z. In the illustrated embodiments, the mesh 12 is flexible in each of the longitudinal, lateral, and transverse directions X, Y, Z. In the embodiment illustrated in FIG. 2, the mesh 12 is formed in a single piece of corrugate 30. The legs 14 and nodes 16 can be formed in the corrugate 30 mechanically, such as by a cutting machine. By way of non-limiting example, in such a cutting machine, the piece of corrugate 30 can be inserted along the longitudinal direction X into an induction end of the machine and can be directed over a bladed roller (i.e., a cylinder with outwardly extending blades) or between a pair of bladed rollers. The bladed roller(s) can carry blades oriented along the longitudinal direction X, for example, and can cut a repeating pattern of through-cuts in the corrugate 30 so as to transform the corrugate 30 into the mesh 12. It is to be appreciated that the foregoing cutting machine represents merely one example of a mechanism for forming the legs 14 and nodes 16 in the mesh 12, and other mechanisms are within the scope of the present disclosure.

Figure 3:
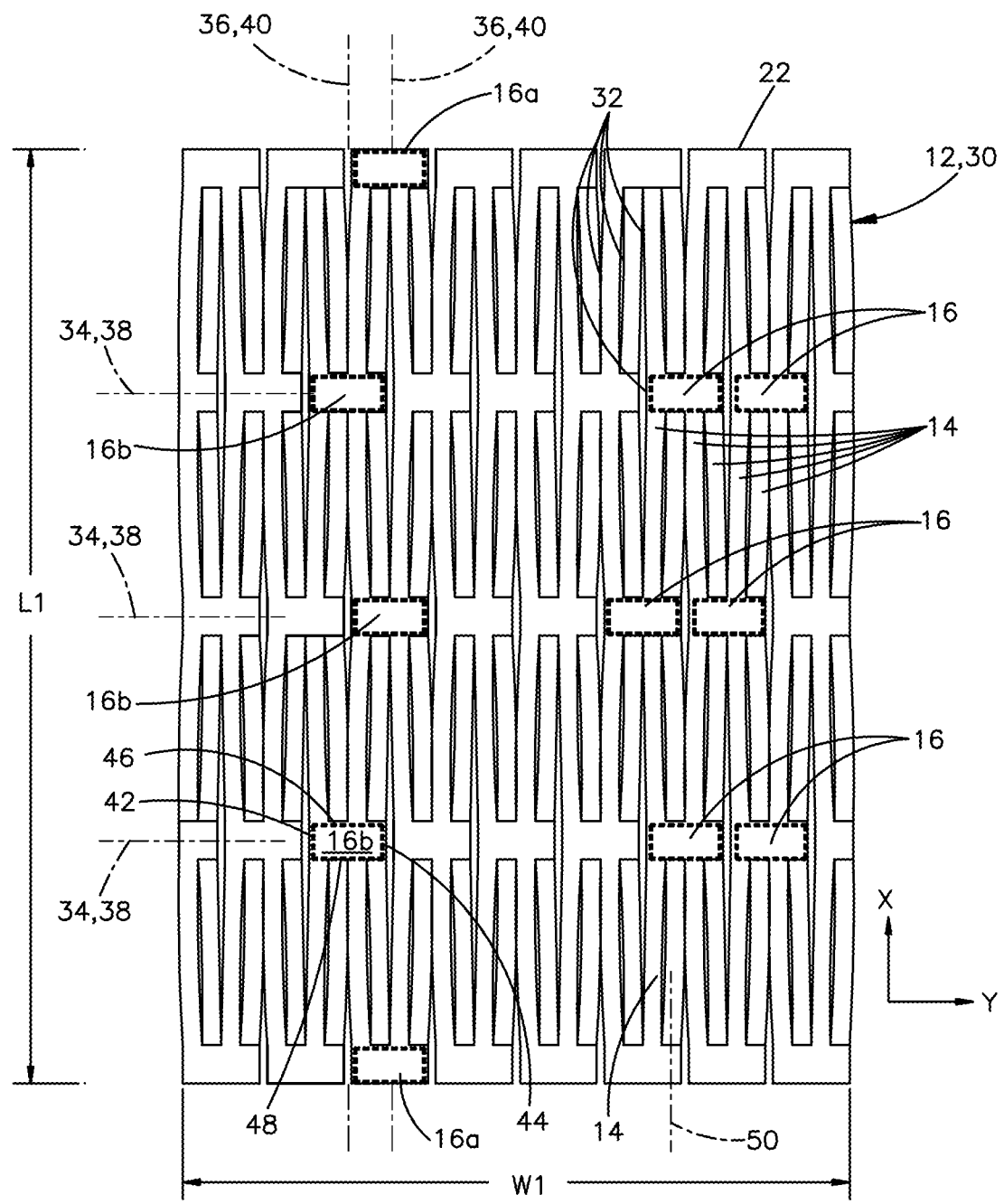
FIG. 3 shows a top view of a portion of the mesh of FIG. 2 in an initial mesh configuration.
Figure 4:
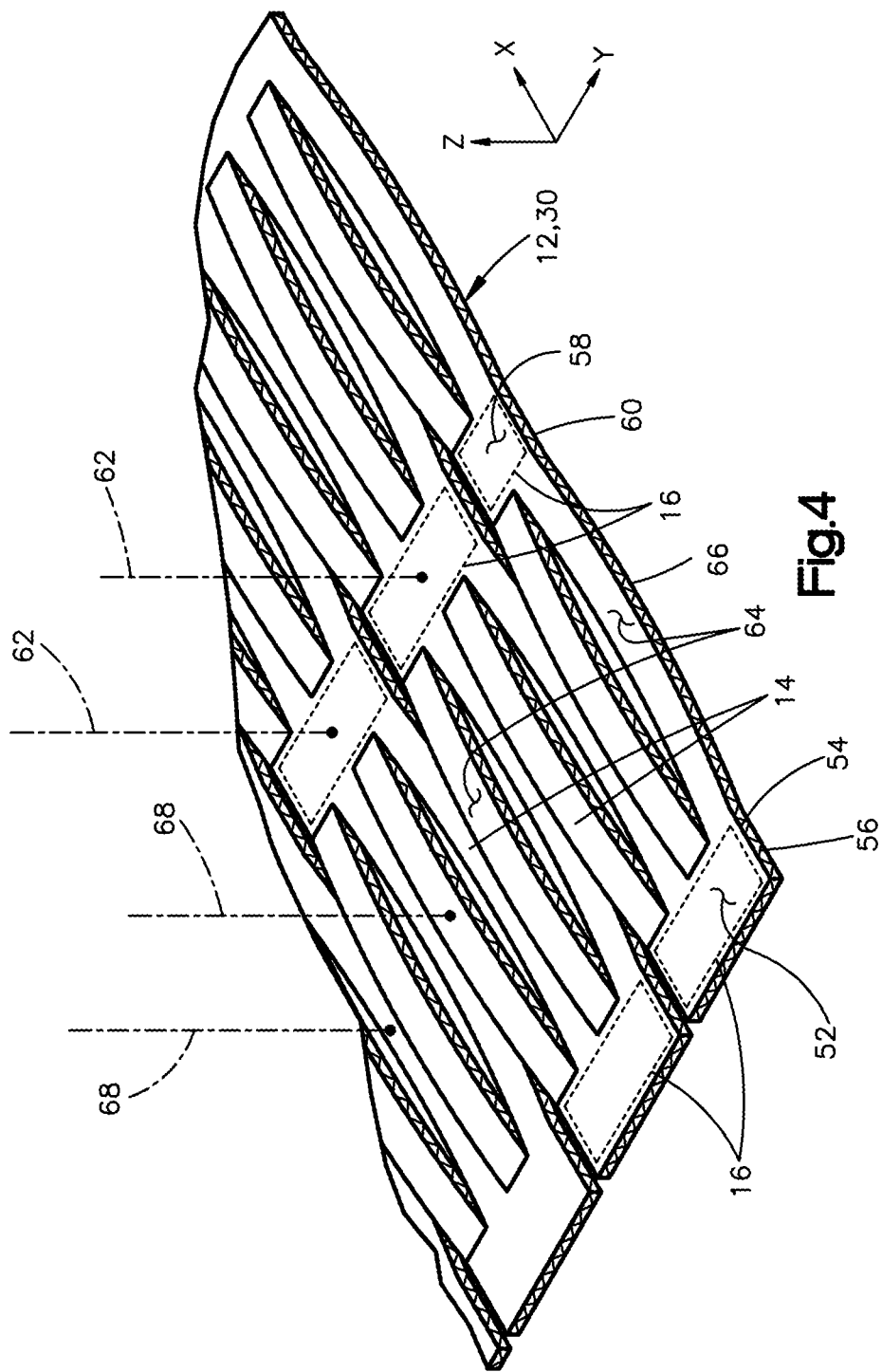
FIG. 4 shows a perspective view of a portion of the mesh of FIG. 2 in the initial mesh configuration.

Referring now to FIGS. 3 and 4, a portion of the mesh 12 of FIG. 2 is shown in an initial, unexpanded mesh configuration, such as when the mesh 12 exits the cutting machine, for example. In FIG. 3, some of the nodes 16 are identified by dashed areas for visualization purposes. The nodes 16 can include peripheral nodes 16a located at the periphery 22 of the mesh 12, as well as non-peripheral or internal nodes 16b inward of the periphery 22. The mesh 12 portion defines an area in the longitudinal and lateral directions X, Y, which area is defined by a first length L1 along the longitudinal direction X and a first width W1 along the lateral direction Y.

Lateral edges of the legs 14 and nodes 16 of the mesh 12 can be defined by through-cuts 32 in the corrugate 30. The mesh pattern can be configured such that the nodes 16 are arranged in rows 34 of nodes 16 and columns 36 of nodes 16. The nodes 16 of each row 34 can be substantially aligned along a row axis 38 extending along the lateral direction Y. Adjacent rows 34 can be spaced from each other along the longitudinal direction X by a distance greater than zero. The nodes of each column 36 can be substantially aligned along a column axis 40 extending along the longitudinal direction X. At least in the initial mesh configuration, the nodes 16 in adjacent node columns 36 can overlap each other with respect to the lateral direction Y.

With reference to FIG. 3, one or more of the nodes 16 can define first and second lateral edges 42, 44 spaced from each other along the lateral direction Y, as well as first and second longitudinal ends 46, 48 spaced from each other along the longitudinal direction X. Each respective node 16 can be connected to an adjacent node 16 by one or more legs 14. In the example embodiment illustrated in FIG. 3, each node 16 has eight legs 14 extending therefrom, with two legs 14 connecting each node 16 to an adjacent node 16. It is to be appreciated that other leg 14/node 16 quantities and/or geometries can be employed.

Each of the legs 14 can be elongated so as to define a longitudinal leg axis 50. In the illustrated embodiment, when the mesh 12 is in the initial mesh configuration, the longitudinal leg axes 50 of each of the legs 14 can be substantially parallel with one another. Additionally, in the initial mesh configuration, the longitudinal leg axes 50 of each of the legs 14 can be oriented substantially along the longitudinal direction X. As shown, in the initial mesh configuration, laterally adjacent nodes 16 and laterally adjacent legs 14 can have minimal, if any, gaps therebetween along the lateral direction Y.

Referring now to FIG. 4, the piece of corrugate 30, and thus the mesh 12 also, defines a top mesh surface 52 and an opposed bottom mesh surface 54 opposite each other substantially along the transverse direction Z. Fluting 56 is disposed between the top and bottom mesh surfaces 52, 54. Each of the nodes 16 can define a top node surface 58 that is defined by the top mesh surface 52, as well as an opposed bottom node surface 60 that is defined by the bottom mesh surface 54. Each node 16 also defines a transverse node axis 62 that is oriented substantially normal to the top and bottom node surfaces 58, 60. As shown in FIG. 4, in the initial mesh configuration, the transverse node axes 62 extend generally near alignment with the transverse direction Z. Additionally, each of the legs 14 can define a top leg surface 64 that is defined by the top mesh surface 52, as well as an opposed bottom leg surface 66 that is defined by the bottom mesh surface 54. Each leg 14 also defines a transverse leg axis 68 that is oriented substantially normal to the top and bottom leg surfaces 64, 66. As shown in FIG. 4, in the initial mesh configuration, the transverse leg axes 68 extend generally near alignment with the transverse direction Z.

Figure 5:
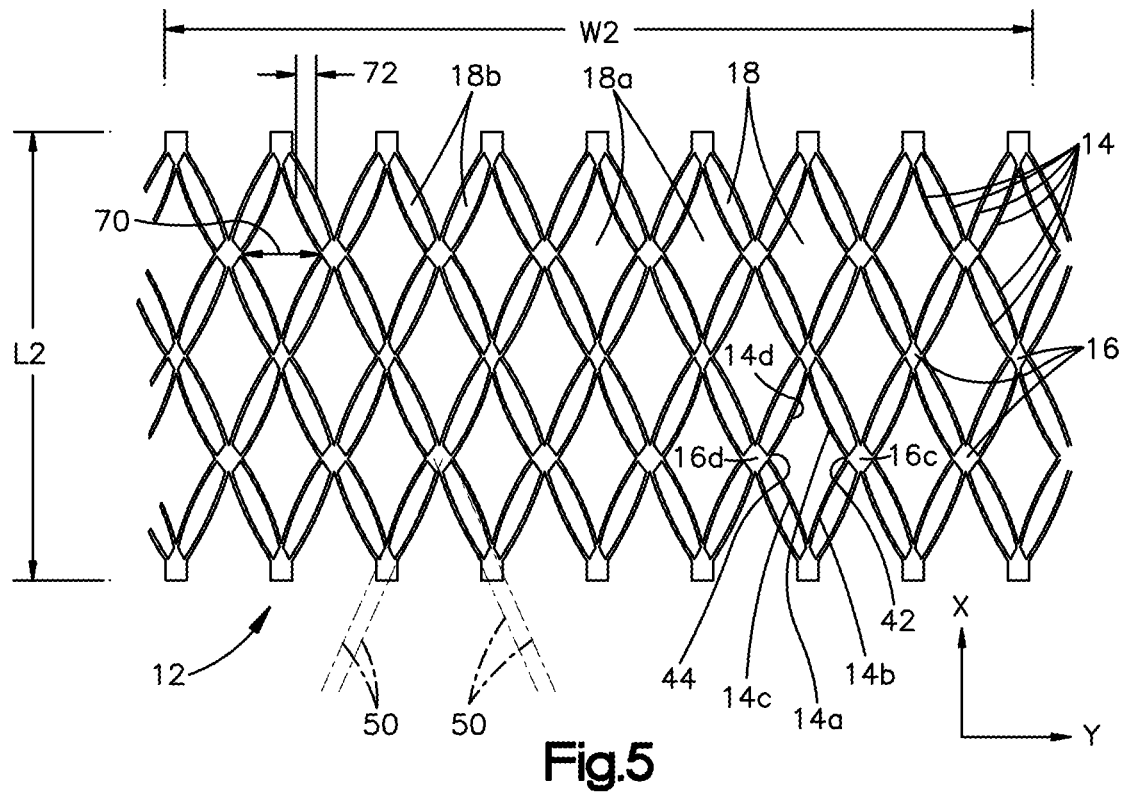
FIG. 5 shows a top view of a portion of the mesh of FIG. 2 in a first expanded configuration.

Referring now to FIG. 5, the mesh 12 portion shown in FIG. 3 is now shown in a first expanded configuration. In the first expanded configuration, the mesh portion 12 can define an area having a second length L2 along the longitudinal direction X and a second width W2 along the lateral direction Y. In the illustrated embodiments, the second width W2 is greater than the first width W1, while the second length L2 is slightly less than the first length L1. Thus, in the first expanded configuration, the mesh 12 portion is expanded or enlarged by stretching along the lateral direction Y and slightly contracted along the longitudinal direction X as a result of the stretching. In the illustrated embodiments, the lateral expansion is greater than the longitudinal contraction. In this manner, the area of the mesh 12 portion increases from the initial configuration to the first expanded configuration.

As shown, in the first expanded configuration, the longitudinal leg axes 50 can be offset from the longitudinal direction X. As the mesh 12 expands laterally, the some of the through-cuts 32 expand into primary gaps 70 between the adjacent nodes 16 and/or legs 14. As the mesh 12 is expands laterally, the primary gaps 70 increase in width along the lateral direction Y so as to define the boundaries of primary ones 18a of the cells 18. In the illustrated embodiment, others of the through-cuts 32 expand into secondary gaps 72 that also increase in width between the pairs of legs 14 that interconnect each node 16 with an adjacent node 16. The secondary gaps 72 define secondary cells 18b that are narrower than the primary cells 18a. As shown, the primary cells 18a (which can constitute a majority of the cells 18) can each have a substantially hexagonal shape, providing the mesh 12 with a substantially honeycomb pattern of primary cells 18a. In particular, the six sides of a hexagon primary cell 18a can be defined by (moving clockwise) a first leg 14a extending from a first node 16c, the first lateral edge 42 of the first node 16c, a second leg 14b extending from the first node 16c, a third leg 14c extending from a second node 16d that is laterally spaced form the first node 16c, the second lateral edge 44 of the second node 16d, and a fourth leg 14d extending from the second node 16d. It is to be appreciated that patterns and other cell geometries are within the scope of the present disclosure.

Figure 6:
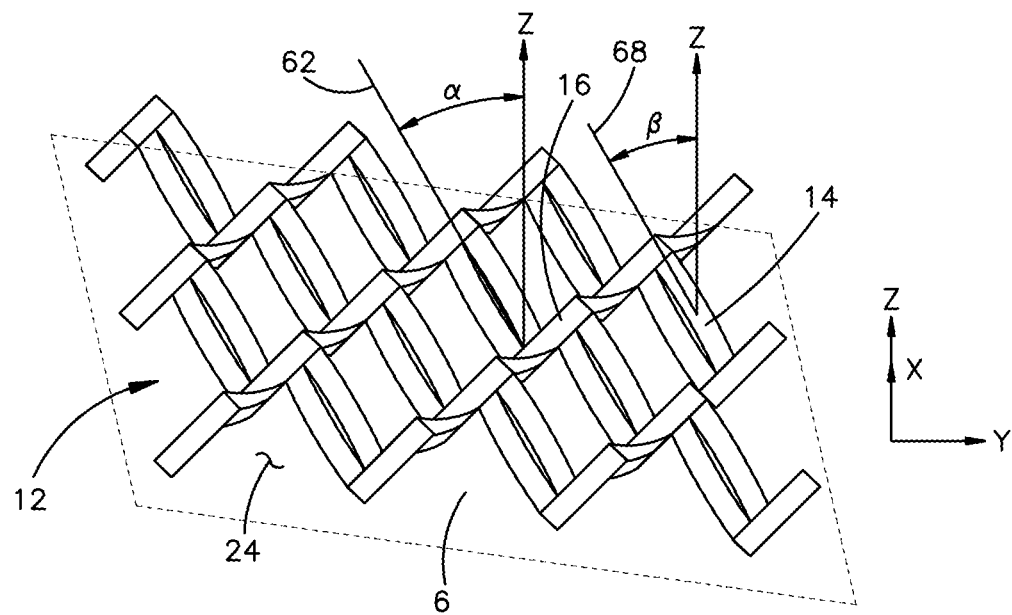
FIG. 6 shows a perspective view of a portion of the mesh of FIG. 5.

Referring now to FIGS. 4 and 6, as the mesh 12 moves from the initial configuration to the first expanded configuration, the transverse node axes 62 (that is, normal projections thereof in a plane extending along the lateral and transverse directions Y, Z) rotate away from substantially near alignment with the transverse direction Z (FIG. 4) to a wider oblique angle α offset from the transverse direction Z (FIG. 6). Similarly, as the mesh 12 moves from the initial configuration to the first expanded configuration, the transverse leg axes 68 (or at least projections thereof in the lateral, transverse plane Y-Z) also rotate away from substantially near alignment with the transverse direction Z (FIG. 4) to a wider oblique angle β offset from the transverse direction Z (FIG. 6). Preferably, oblique angles α and β are substantially equivalent.

Figure 7:
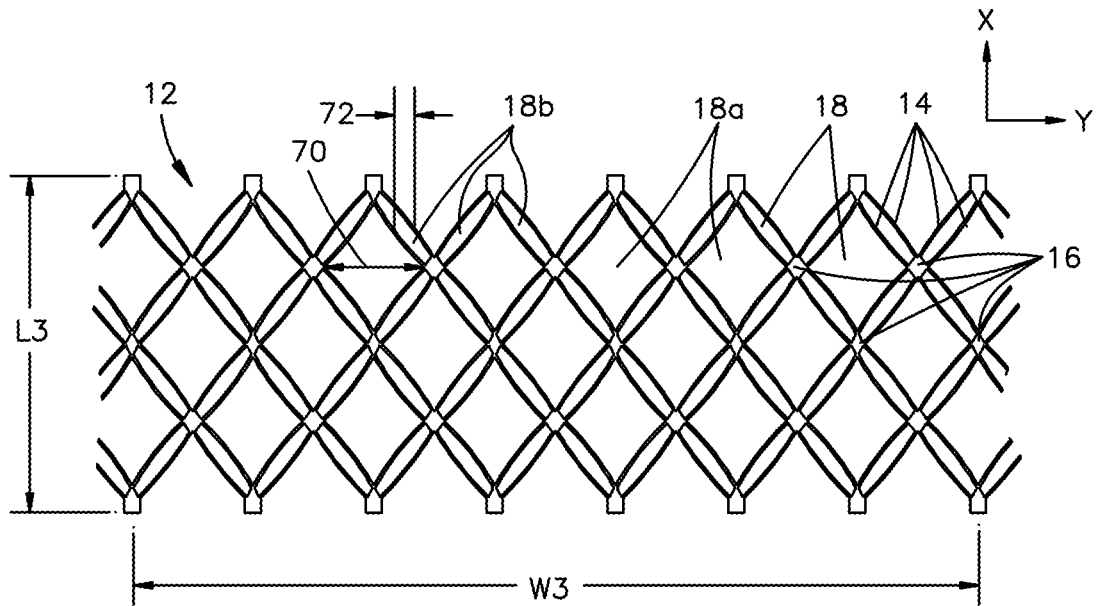
FIG. 7 shows a top view of a portion of the mesh of FIG. 2 in a second expanded configuration.

Referring now to FIG. 7, the mesh 12 portion is now shown in a second expanded configuration, in which the lateral expansion is greater than that of the first expanded configuration. In the second expanded configuration, the area of the mesh portion 12 has a third width W2 along the lateral direction Y that is greater than the second width W2, as well as third length L2 along the longitudinal direction X that is slightly less than the second length L2. Thus, in the second expanded configuration, the mesh 12 portion is expanded (by stretching) along the lateral direction Y and slightly contracted along the longitudinal direction X relative to the first expanded configuration. As before, the lateral expansion is greater than the longitudinal contraction so that the area of the mesh 12 portion increases from the first to the second expanded configuration. Additionally, the primary and secondary gaps 70, 72 in the mesh 12 are wider along the lateral direction Y in the second expanded configuration than in the first expanded configuration.

Figure 8:
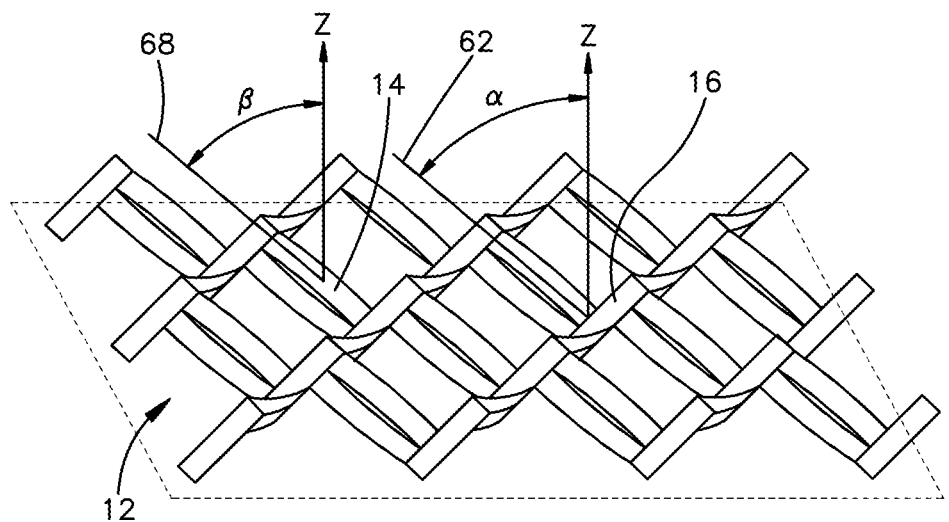
FIG. 8 shows a perspective view of a portion of the mesh of FIG. 7.

Referring now to FIGS. 6 and 8, as the mesh 12 moves from the first to the second expanded configuration, the respective oblique angles α, β of the transverse node axes 62 and transverse leg axes 14 increase. In this manner, as the mesh 12 is stretched laterally, the transverse axes 62, 68 of the nodes 16 and legs 14 (or at least some, or preferably no less than a majority of the nodes and legs) are each reoriented. Accordingly, as the mesh 12 is laterally stretched, the legs 14 and nodes 16 transition from a configuration in which the top and bottom node surfaces 58, 60 and the top and bottom leg surfaces 64, 66 become less parallel with, and more perpendicular to, the outer layers 6, 8 of the packaging cushion 2. As shown in FIGS. 6, and 8, in the first and second expanded configurations, the points of contact between the mesh 12 and the outer layers 6, 8 occur at least primarily at the first and second lateral edges 42, 44 of the nodes 16, increasing the compressive strength of the mesh 12 at each node 16. The compressive strength of the mesh 12 at each node 16 increases with the increased perpendicularity between the top and bottom node surfaces 58, 60 and the outer layers 6, 8. Additionally, it has been observed that the average compressive strength of the mesh 12 increases with increasing lateral expansion of the mesh 12. It has also been observed that the multi-directional flexibility of the mesh 12 responsive to compressive forces along the transverse direction Z increases with increased lateral expansion of the mesh 12. Prior art corrugate, at least in some configurations, may have similar compressive strength relative to the packaging cushions 2 disclosed herein. However, when a fold or crease is formed in prior art corrugate that, for example, extends transversely through the corrugate layer, the corrugate exhibits localized weakness in the area of the fold or crease. Prior art corrugate also has preferred bending along the flutes, which has limitations in packaging that needs to be bent in multiple directions. In contrast to prior art corrugate, the inventors have observed that, in each of the embodiments disclosed herein, the packaging cushion 2 exhibits multi-directional flexibility responsive to each of transverse, lateral and longitudinal compressive forces, as well as to torsional forces. This multi-directional flexibility enables these embodiments to bend without significantly impairing the performance of the packaging cushion 2.

Figure 9:
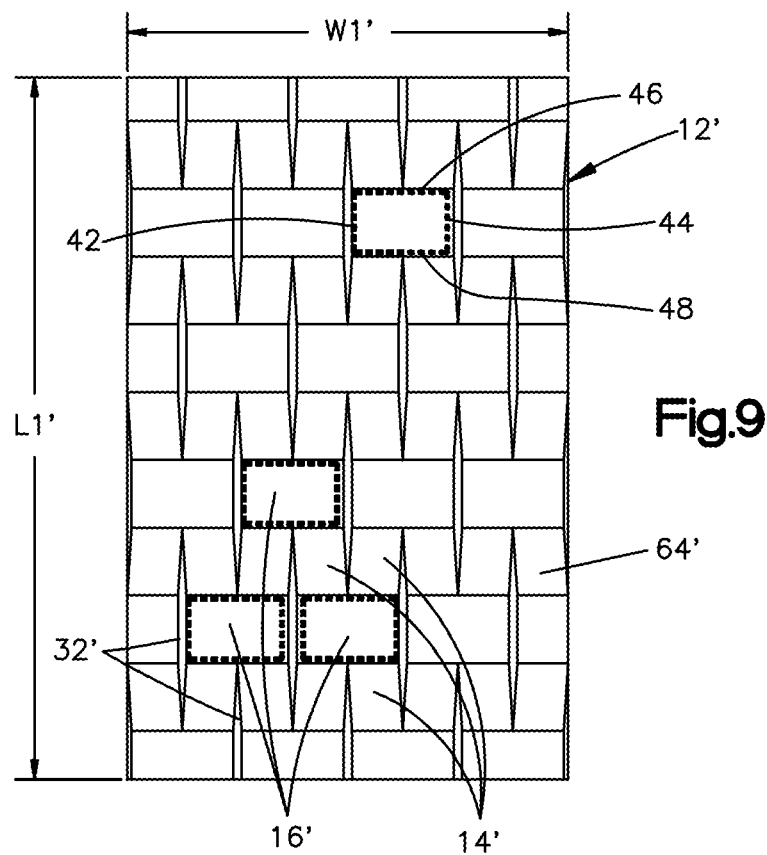
FIG. 9 shows a top view of a portion of a mesh according to another embodiment of present disclosure, wherein the mesh is formed in a piece of kraft paper, and is shown in an initial mesh configuration.
Figure 10:
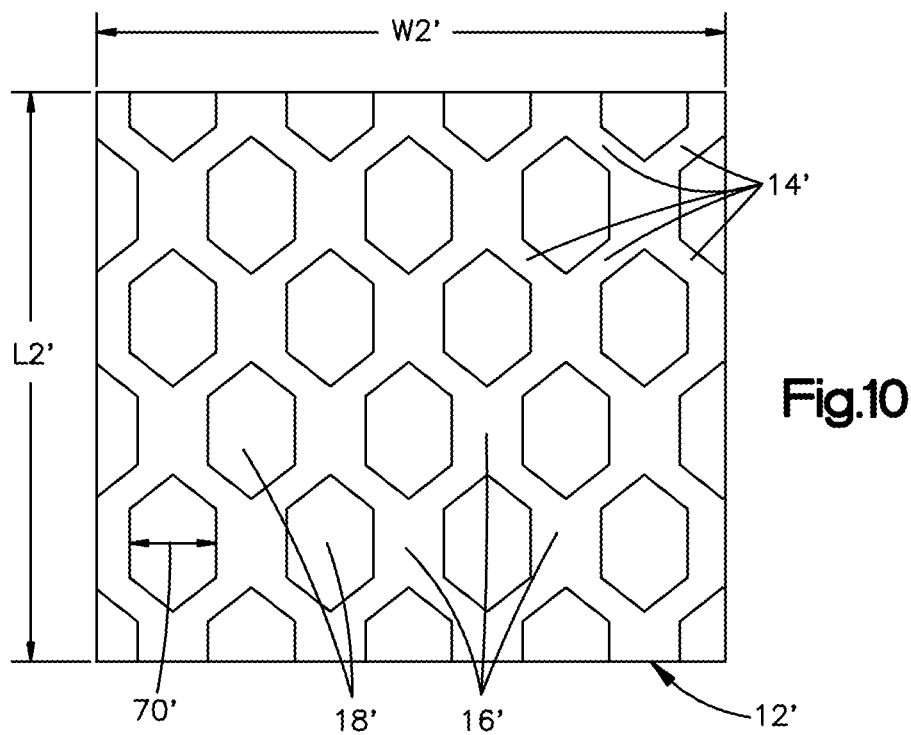
FIG. 10 shows a top view of the portion of the mesh of FIG. 9 in an expanded mesh configuration.

Referring now to FIGS. 9 and 10, an additional embodiment of the mesh 12' is shown. The mesh 12' may comprise packaging paper, such as kraft paper, for example. The mesh 12' of the present embodiment can be configured generally similarly to the mesh 12 described above with reference to FIGS. 2 through 8. In particular, the mesh 12' includes a plurality of legs 14' extending between a plurality of nodes 16' so as to define a plurality of voids/cells 18' in the mesh 12'. Some of the nodes 16' in FIG. 9 are indicated by dashed areas for visualization purposes. As above, one or more of the nodes 16' can define first and second lateral edges 42', 44' spaced from each other along the lateral direction Y, as well as first and second longitudinal ends 46', 48' spaced from each other along the longitudinal direction X. In the illustrated embodiment, each respective node 16' can be connected to an adjacent node 16' by a single leg 14', with each internal node 16b' having four legs 14 extending therefrom.

The edges of the legs 14' and nodes 16' of the mesh 12' can be defined by through-cuts 32' formed therein by a cutting machine (for example, a paper-cutting machine). As above, the legs 14' and nodes 16' can be arranged such that, as the mesh 12' is stretched laterally, the through-cuts 32' expand into gaps 70' so as to define the cells 18. The cells 18' can each be hexagonal so as to define a honeycomb pattern in the mesh 12', although other cell geometries and other patterns are within the scope of the present disclosure.

Each of the nodes 16' can define a top node surface 52' and a bottom node surface 54' that are respectively defined by top and bottom surfaces 52', 54' of the packaging from which the mesh 12' was formed. Each node 16' also defines a transverse node axis 62' that is oriented substantially normal to the top and bottom node surfaces 52', 54'. Each of the legs 14' can define a top leg surface 64' and a bottom leg surface 66' that are respectively defined by top and bottom surfaces 52', 54' of the packaging. Each leg 14' also defines a transverse leg axis 68' that is oriented substantially normal to the top and bottom leg surfaces 64', 66'.

As above, the mesh 12' can be expanded laterally, such as by stretching, so that an area of the mesh 12' increases. As shown in FIG. 9, in an initial mesh configuration, the mesh 12' defines a first length L1' along the longitudinal direction X and a first width W1' along the lateral direction Y. As shown in FIG. 10, the mesh 12' can be expanded to an expanded mesh configuration, wherein the mesh 12' defines a second length L2' that is slightly less than the first length L1' and a second width W2' that is greater than the first width W1'.

Figure 11:
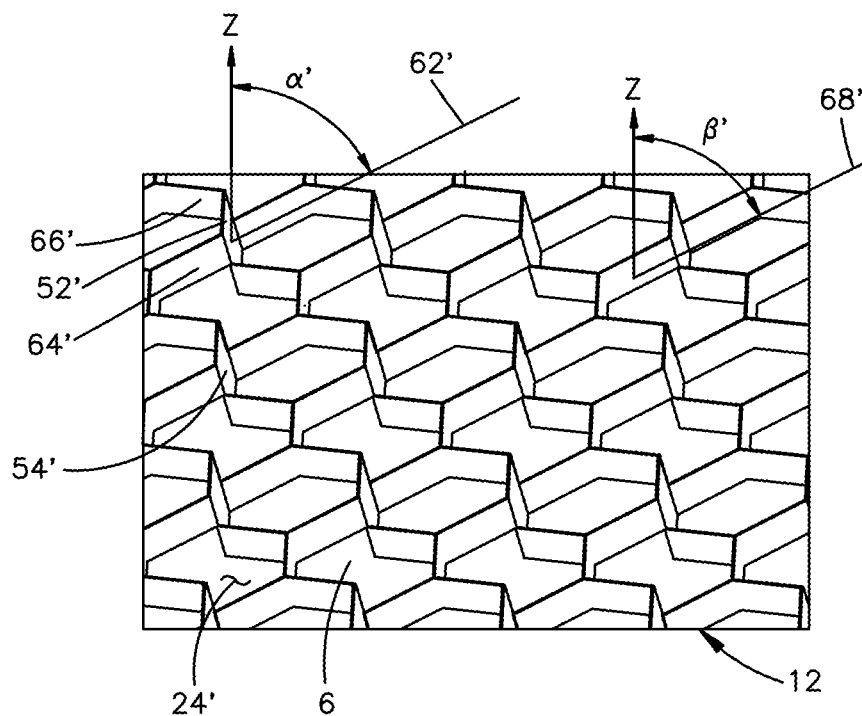
FIG. 11 shows a perspective view of the portion of the mesh of FIG. 10.

Referring now to FIG. 11, in a similar manner to that described above with reference to FIGS. 6 and 8, as the mesh 12' is expanded laterally, respective oblique angles α', β' of the transverse node axes 62' and transverse leg axes 14' increase. In this manner, the top and bottom node surfaces 58', 60' and the top and bottom leg surfaces 64', 66' each become less parallel with, and more perpendicular to, the outer layers 6, 8 of the packaging cushion 2. Accordingly, the inventors have observed that a packaging cushion 2 employing the mesh 12' of the present embodiment exhibits similar multi-directional flexibility benefits to those set forth above with reference to FIGS. 3 through 8.

It is to be appreciated that while the illustrated embodiments show meshes 12, 12' may be formed of corrugate and packaging paper (such as kraft paper), a mesh can similarly be formed of other materials, including paperboard, other paper-based packaging materials, metal, and plastic, such as recyclable plastic.

Figure 12:
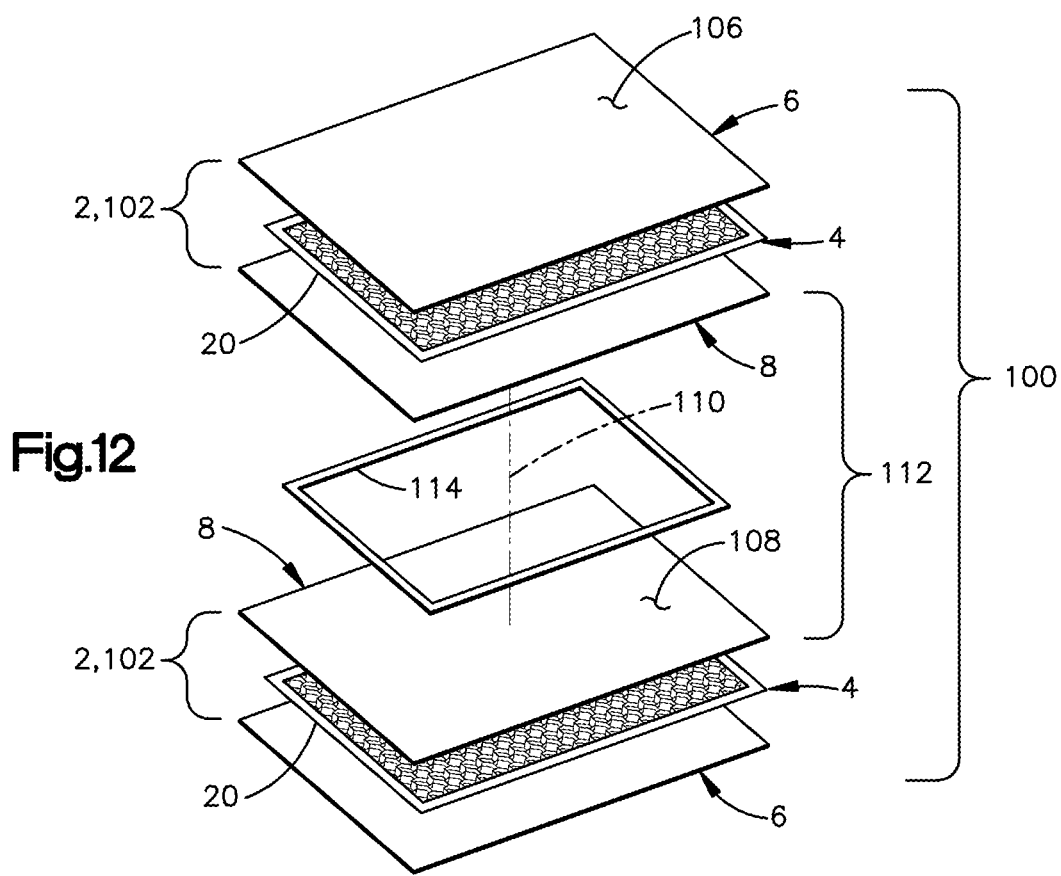
FIG. 12 shows an exploded perspective view of a padded envelope employing a cushioning layer, according to an embodiment of the present disclosure.

Referring now to FIG. 12, a package, such as a padded envelope 100, can employ one or more packaging cushions 2 that are configured as set forth above. While a padded envelope 100 is described herein, it is to be appreciated that virtually any type of package can employ one or more of the packaging cushions 2. The padded envelope 100 can include a first panel 102 overlaying a second panel 104. Each panel 102, 104 can include a packaging cushion 2 having a cushion layer 4 disposed between a first or outer liner 6 and a second or inner liner 8. The cushion layer 4 of each panel 102, 104 can include a mesh 12 coupled to the liners 6, 8 with a binder 20. The mesh 12 and binder 20 can each be configured according to any of the respective embodiments set forth above.

The outer liners 6 can each define an outer surface 106 of the respective panel 102, 104 and the inner liners 8 can each define an inner surface 108 of the respective panel 102, 104. Each panel 102, 104 can define a transverse liner axis 110 that extends substantially normal to the respective outer and inner surfaces 106, 108 (in FIG. 12, the transverse liner axes 110 of the first and second panels 102, 104 are coextensive). The inner liners 8 of the panels 102, 104 can collectively define an internal storage compartment 112 of the envelope 100. The inner liners 8 can be attached together with a package bond 114, which can employ any of the types of binders 20, 26 set forth above. Each of the liners 6, 8, meshes 12, and binders 20 of the panels 102, 104 can be formed of one or more paper-based materials that are curbside recyclable. Additionally, any labels applied to the package, as well as the adhesives used therewith, can also be curbside recyclable. In this manner, the padded envelope 100 can be curbside recyclable.

Figure 13:
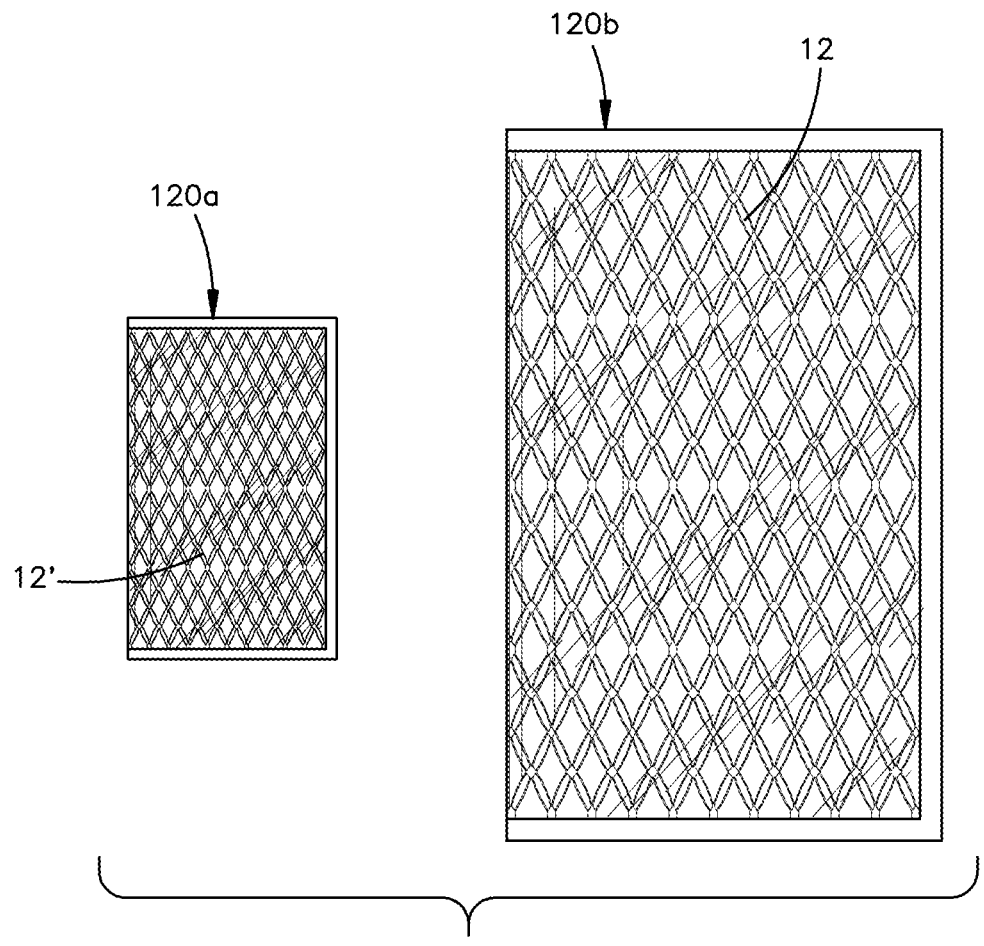
FIG. 13 shows a perspective view of a pair of padded envelopes employing a mesh cushioning layer.
Figure 14:
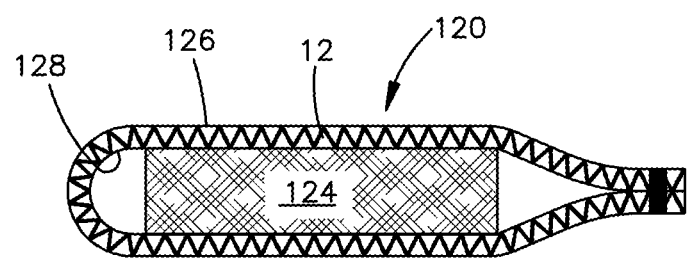
FIG. 14 shows an end sectional view of a single-panel package employing a mesh packaging cushion, according to an embodiment of the present disclosure.

Referring now to FIGS. 13 and 14, padded packages 120 according to additional embodiments can include a single packaging cushion 122 wrapped around an item 124 (FIG. 14). As above, the packaging cushion 122 can include an outer liner 126, an inner liner 128, and a mesh 12 disposed in between the liners 126, 128. In FIG. 13, one such padded package 120a having a kraft mesh 12' is shown alongside another such padded package 120b having a corrugate mesh 12. In FIG. 13, portions of the outer liners 126 are transparent so that the meshes 12, 12' are visible. As above, each of the padded packages can be curbside recyclable. It is to be appreciated that other packaging products incorporating packaging cushions 2 are within the scope of the present disclosure.

Figure 15:
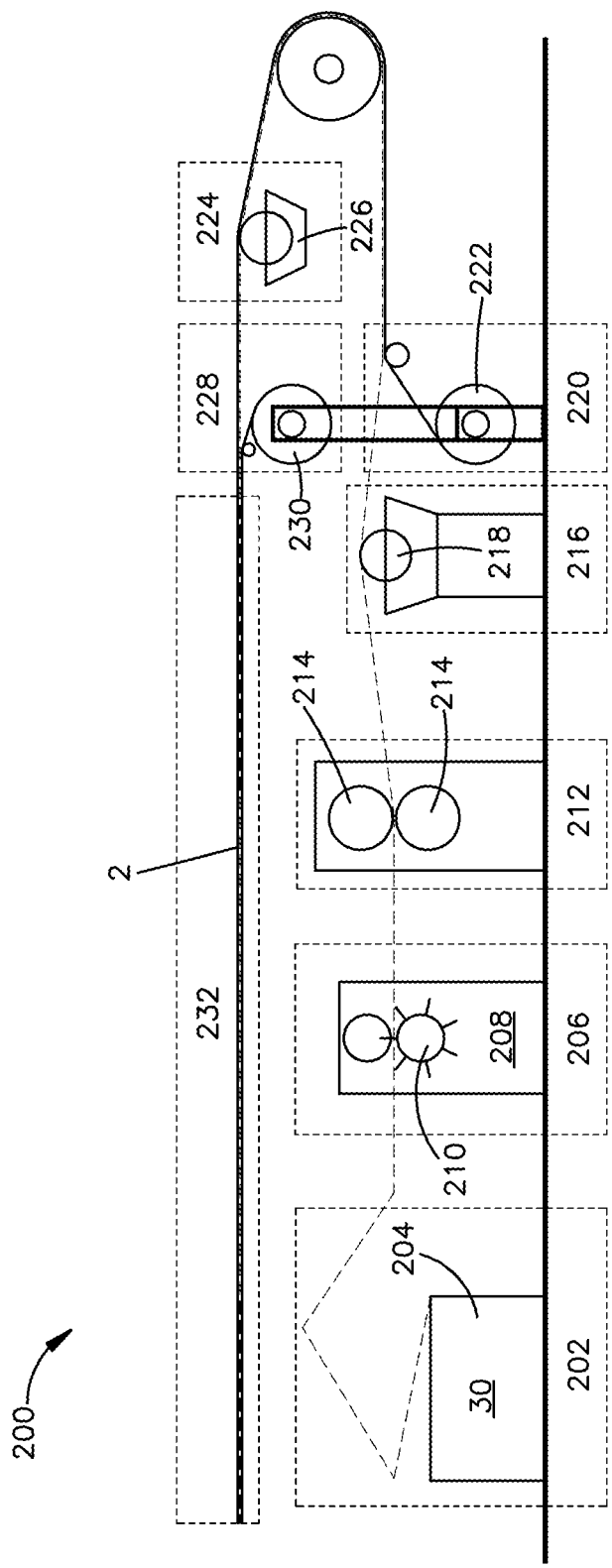
FIG. 15 shows a schematic plan diagram of a system for making a mesh packaging cushion, according to an embodiment of the present disclosure.

Referring now to FIG. 15, an example system 200 for making a cushioning layer 2 can include a first zone 202 in which a supply 204 of paper-based product is located, such as a z-fold stack of raw corrugate 30, or example. A second zone 206 can include a cutting machine 208 employing bladed rollers 210, for example, to form the mesh 12. A third zone 212 can include one or more stretching rollers 214 to expand the mesh 12 into an expanded configuration. A fourth zone 216 can include a glue vat roller 218 for disposing glue on a bottom surface of the mesh 12. A fifth zone 220 can include a supply of kraft paper 222 for lamination on the bottom surface of the mesh. A sixth zone 224 can include another glue vat roller 226 for disposing glue on the top surface of the mesh 12. A seventh zone 228 can include another supply of kraft paper 230 for lamination on the top surface of the mesh 12. An eighth zone 232 can define a fully formed paper-based packaging cushion 2. The foregoing example system 200 represents merely one example of various system configurations for making a paper-based packaging cushion 2.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. An envelope, comprising:
   one or more panels organized so as to define an internal compartment, wherein each of the one or more panels includes:
      a first liner defining an outer surface of the respective panel,
      a second liner defining an inner surface of the respective panel, the inner surface defining at least a portion of the internal compartment;
      a transverse liner axis extending substantially normal to the inner and outer surfaces;
      a mesh bonded to one or both of the first and second liners, the mesh having a top mesh surface and an opposed bottom mesh surface, the mesh defining:
         a plurality of nodes each defining 1) a top node surface defined by the top mesh surface, 2) a bottom node surface defined by the bottom mesh surface, and 3) a transverse node axis extending substantially normal to the top and bottom node surfaces, wherein the transverse node axes of at least some of the plurality of nodes are each oriented at an oblique angle relative to the transverse liner axis; and
         a plurality of legs interconnecting the plurality of nodes, wherein the plurality of nodes and the plurality of legs have multi-directional flexibility; and
      a binder that bonds the mesh to the one or both of the first and second liners, wherein the binder adheres at least a subset of the plurality of legs and at least a subset of the plurality of nodes together to one or both of the first and second liners.

2. The envelope of claim 1, wherein the one or more panels comprises a single panel that is wrapped around itself so that 1) the inner surface of the second liner defines the internal compartment, and 2) the outer surface of the first liner defines an exterior of the envelope.

3. The envelope of claim 1, wherein the one or more panels comprises a pair of panels each defining a periphery, wherein the pair of panels are bonded together at a portion of the respective peripheries so as to define the internal compartment between the pair of panels.

4. The envelope of claim 1, wherein each of the first and second liners comprises kraft paper, and the mesh comprises one of kraft paper, paperboard, and corrugate.

5. The envelope of claim 1, wherein the binder is a substantially entirely paper-recyclable binder.

6. The envelope of claim 1, wherein each of the first and second liners comprises kraft paper, and the mesh comprises kraft paper.

7. An envelope, comprising:
   a panel folded over itself so as to define an internal compartment, wherein the panel includes:
      a first liner defining an outer surface of the panel,
      a second liner defining an inner surface of the panel, the inner surface defining at least a portion of the internal compartment;
      a transverse liner axis extending substantially normal to the inner and outer surfaces;
      a mesh disposed between the first and second liners, the mesh having a top mesh surface and an opposed bottom mesh surface, the mesh defining:
         a plurality of nodes each defining 1) a top node surface defined by the top mesh surface, 2) a bottom node surface defined by the bottom mesh surface, and 3) a transverse node axis extending substantially normal to the top and bottom node surfaces, wherein the transverse node axes of at least some of the plurality of nodes are each oriented at an oblique angle relative to the transverse liner axis; and
         a plurality of legs interconnecting the plurality of nodes, wherein the plurality of nodes and the plurality of legs have multi-directional flexibility; and
      a binder that bonds the mesh to at least one of the first and second liners, wherein the binder adheres at least a subset of the plurality of legs and at least a subset of the plurality of nodes to the at least one of the first and second liners.

8. The envelope of claim 7, wherein the binder adheres at least a majority of the plurality of nodes to the at least one of the first and second liners.

9. The envelope of claim 7, wherein the binder is applied as an even coating of adhesive to the at least one of the first and second liners.

10. The envelope of claim 7, wherein the inner surface of the second liner defines the internal compartment, and the outer surface of the first liner defines an exterior of the envelope.

11. The envelope of claim 7, wherein each of the first and second liners comprises kraft paper, and the mesh comprises kraft paper.

12. The envelope of claim 11, wherein the binder is a substantially entirely paper-recyclable binder.

13. The envelope of claim 7, wherein the panel has a first portion and a second portion folded over each other, the first and second portions each define a periphery, and the first and second portions are bonded together along a portion of the respective peripheries so as to define the internal compartment.

14. The envelope of claim 13, further comprising a second binder that binds the first and second portions of the panel together.

15. The envelope of claim 14, wherein the binder and the second binder are each a substantially entirely paper-recyclable binder.

16. An envelope, comprising:
a panel folded over itself so as to define an internal compartment, wherein the panel includes:
 a liner having an inner surface and an outer surface, wherein the outer surface defines an outer surface of the panel, and the inner surface is adjacent an internal compartment of the folded panel;
 a transverse liner axis extending substantially normal to the inner and outer surfaces;
 a mesh attached to the liner, the mesh having a top mesh surface and an opposed bottom mesh surface, the mesh defining:
  a plurality of nodes each defining 1) a top node surface defined by the top mesh surface, 2) a bottom node surface defined by the bottom mesh surface, and 3) a transverse node axis extending substantially normal to the top and bottom node surfaces, wherein the transverse node axes of at least some of the plurality of nodes are each oriented at an oblique angle relative to the transverse liner axis; and
  a plurality of legs interconnecting the plurality of nodes, wherein the plurality of nodes and the plurality of legs have multi-directional flexibility; and
 a binder that bonds the mesh to the inner surface of the liner, wherein the binder adheres at least a subset of the plurality of legs and at least a subset of the plurality of nodes to the inner surface.

17. The envelope of claim 16, wherein each of the first and second liners comprises kraft paper, and the mesh comprises kraft paper.

18. The envelope of claim 17, wherein the binder is a substantially entirely paper-recyclable binder.

19. The envelope of claim 16, wherein the panel has a first portion and a second portion folded over each other, the first and second portions each define a periphery, and the first and second portions are bonded together along a portion of the respective peripheries so as to define the internal compartment.

20. The envelope of claim 19, further comprising a second binder that binds the first and second portions of the panel together.

* * * * *